L. D. LOVEKIN, C. J. RAMSBURG & R. P. NICHOLS.
THERMAL ENGINE.
APPLICATION FILED OCT. 31, 1912.
1,149,588. Patented Aug. 10, 1915.
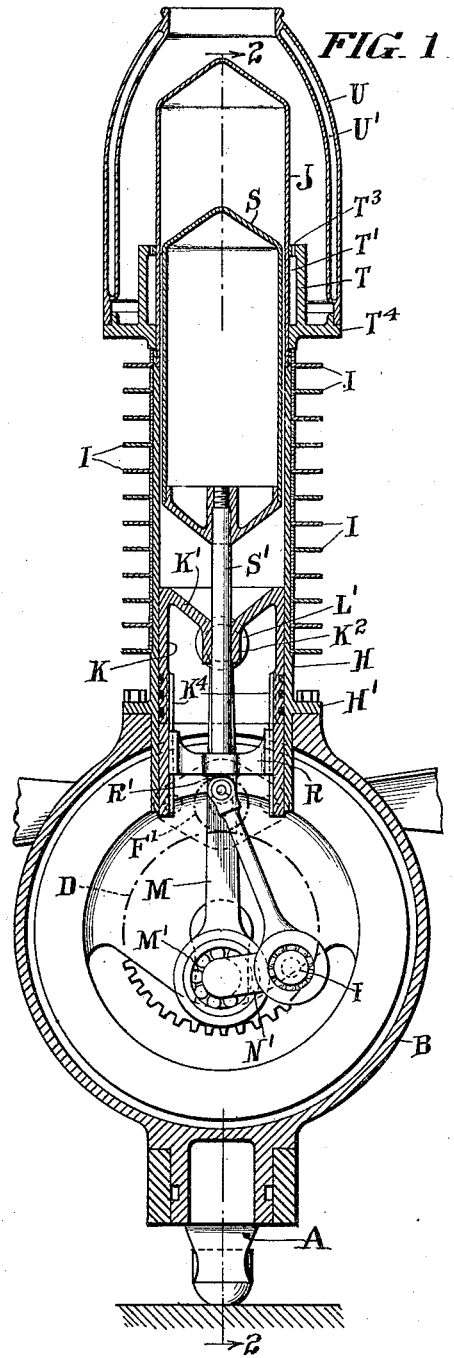
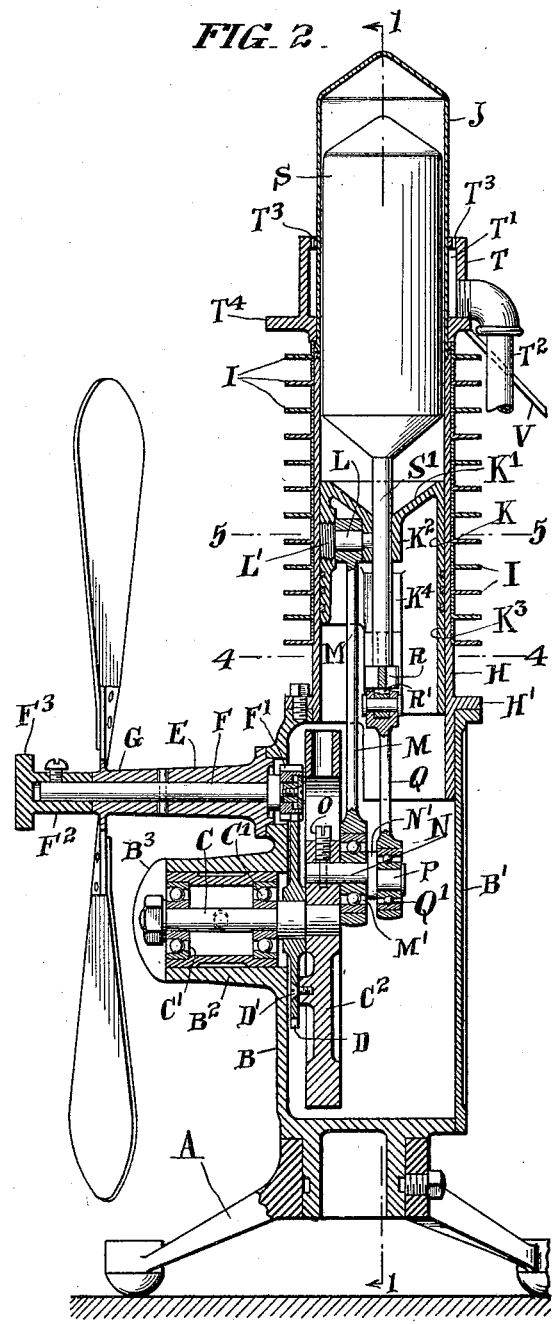
INVENTORS
Luther D. Lovekin
Charles J. Ramsburg
Robert P. Nichols

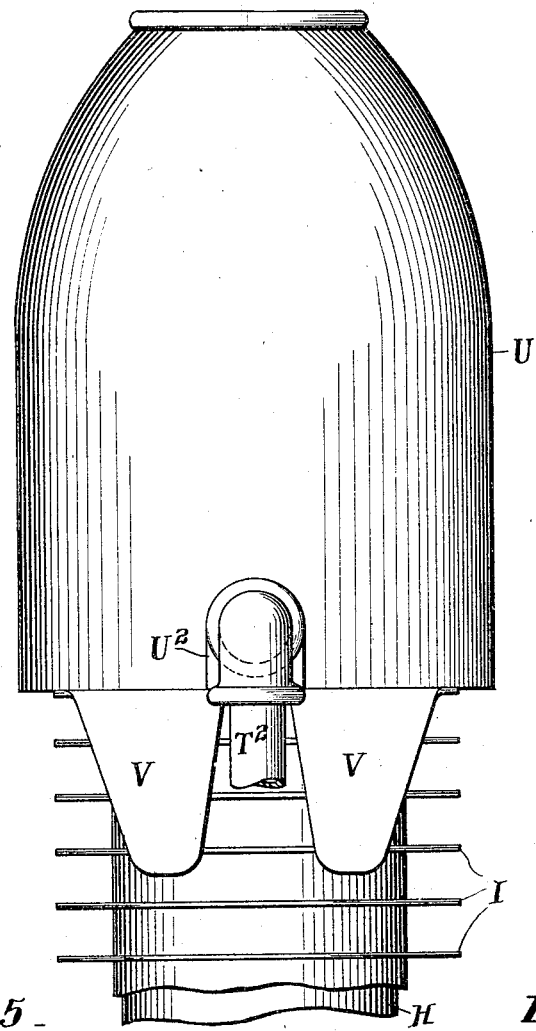
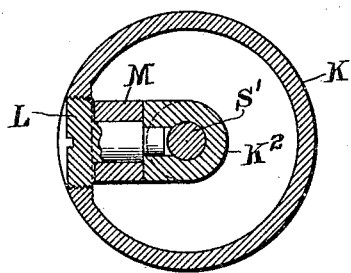
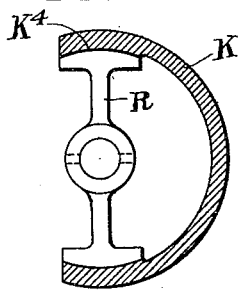
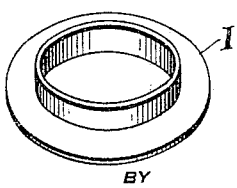

UNITED STATES PATENT OFFICE.

LUTHER D. LOVEKIN AND CHARLES J. RAMSBURG, OF PHILADELPHIA, PENNSYLVANIA, AND ROBERT P. NICHOLS, OF CHICAGO, ILLINOIS, ASSIGNORS TO THERMAL MOTOR COMPANY, OF CAMDEN, NEW JERSEY, A CORPORATION OF NEW JERSEY.

THERMAL ENGINE.

1,149,588.   Specification of Letters Patent.   Patented Aug. 10, 1915.

Application filed October 31, 1912. Serial No. 728,771.

*To all whom it may concern:*

Be it known that we, LUTHER D. LOVEKIN and CHARLES J. RAMSBURG, residing in the city and county of Philadelphia, State of Pennsylvania, and ROBERT P. NICHOLS, residing in the city of Chicago, county of Cook, State of Illinois, all citizens of the United States of America, have invented a certain new and useful Improvement in Thermal Engines, of which the following is a true and exact description, reference being had to the accompanying drawings, which form a part thereof.

Our present invention consists in an improved hot air engine of the type disclosed in Patent No. 992,061, granted May 9, 1911, to Ramsburg, Phillips and Swope.

Our improved engine, while useful for many purposes, was primarily devised for use as the driving element of a portable fan or blower suitable for domestic or office use such as is disclosed in said prior patent.

The general object of the present invention is to make engines of the type specified more efficient and satisfactory. More specifically, one object of the invention is to provide an efficient and compact engine structure of the type referred to in which the wear and loss of power, due to friction and the injurious consequences of such wear, are minimized, and another specific object of the invention is to so construct and arrange the heat dissipating and heat insulating portions of the engine as to insure a high efficiency of operation in a hot air engine of compact construction and operating at relatively high speeds.

The various features of novelty which characterize our invention are pointed out with particularity in the claims annexed to and forming a part of this specification. For a better understanding of the invention, however, and of the advantages possessed by it, reference should be had to the accompanying drawings and descriptive matter in which we have illustrated and described several forms in which our invention may be embodied.

Of the drawings, Figure 1 is a sectional elevation on the line 1—1 of Fig. 2; Fig. 2 is a sectional elevation taken at right angles to and on the line 2—2 of Fig. 1; Fig. 3 is a partial side elevation of the engine; Fig. 4 is a sectional plan taken on the line 4—4 of Fig. 2; Fig. 5 is a sectional plan taken on the line 5—5 of Fig. 2, and Fig. 6 is a perspective view of one of the heat radiating rings employed.

In the engine shown by the drawings, B represents the lower main casing or housing detachably mounted on the tripod A. The housing B is formed with one open side normally closed by the removable cover plate B'. On the opposite side of the housing B from that closed by the cover B' is formed an integral tubular boss $B^2$ in which are mounted the ball bearings C' for the main shaft C of the engine. The latter carries within the housing a fly wheel $C^2$ and the gear D. The gear D, which is coaxial with the shaft C, is shown as secured to the fly wheel C by screws D'. The outer end of the hollow boss $B^2$ is closed by a removable dust guard cap $B^3$. The housing B has secured to it a sleeve E arranged parallel to and above the boss $B^2$. In this sleeve is journaled the fan shaft F which carries at its inner end a gear F' meshing with the gear D. The hub of the fan wheel G is secured to the shaft F at the outer end of the sleeve E, and a cap $F^2$ having a knurled head $F^3$ secured at the outer end of the shaft forms a means for starting the fan into rotation. The lower end of the engine cylinder H projects down into the housing B through the open upper end of the latter. The cylinder H is provided with a flange H' adjacent its lower end adapted to be bolted against a flange formed at the upper end of the housing element B. The upper member of the cylinder member H is unflanged to permit the heat radiating rings I to be put in place. As shown, these rings are in the form of seamless pieces of metal of good heating conductivity, such as copper, and each comprising a cylindrical body portion, and an outturned radial flange portion. The rings I may advantageously be punched out of sheet metal, and are preferably so formed that the cylindrical body portion of each ring has a driving fit on the outer wall of the cylinder member H. The cylindrical bodies of the rings form spacers fixing the distance between the radial flange portions of adjacent rings. This construction of cylinder and heat radiating rings insures a highly efficient heat conducting relation between the cylinder proper and the rings and the bodies, as well as the radial flange portions of the rings form efficient heat radiating and dissipating surfaces. These rings, moreover, add an element of neatness to the apparatus and may easily be kept clean and in condition to operate most efficiently as heat radiating devices.

The cylinder member H is formed with an internal threaded socket at its upper end into which is screwed the externally threaded lower end of the cylinder extension J. The latter has a closed conical upper end and is formed of thin metal such as that known as "Monell" metal. Working within the cylinder H is a piston member K. The piston is in the form of a hollow cylinder having its lower end open and its upper end closed by an end wall K' in the shape of an inverted cone, and provided with a central depending hollow boss $K^2$. A connecting rod M extending between the piston and the crank pin N secured to the fly wheel C is secured to the piston K by a bearing pin on shaft L. The bearing pin L is formed with a reduced inner end entered in a socket formed in the boss $K^2$, and has an enlarged outer and externally threaded head L' which is screwed into a threaded opening formed in the cylindrical body of the piston K. The crank pin N is secured in place in the fly wheel C by a pin O having a slender elongated shank extending through the pin N and an enlarged outer threaded portion screwed into a threaded socket formed in the fly wheel. Preferably as shown, the lower end of the connecting rod M is journaled on the crank pin N by the ball bearing M'. The crank pin N is formed with a crank arm N' supporting at its free end a crank pin or shaft P on which is journaled through the ball bearing Q' the lower end of a second connecting rod Q. The upper end of the connecting rod Q is pivotally connected to the extension R' of a cross head R which bears at its opposite ends against the cylindrical guide surfaces $K^3$ formed on the inner side of the cylindrical body of the piston K and extending parallel to the axis of the latter. Secured to the cross head R is the lower end of the stem S' of the air displacer or agitator which is secured to the upper end of the stem above the piston K. The stem S' has a sliding fit in the boss $K^2$. The agitator or air displacer S which works in the space inclosed by the cylinder member K and the extension J thereof is preferably in the form of a hollow metal body having conical ends corresponding to the conical cavities formed in the upper ends of the cylinder extension J and piston K, and while not contacting with the inner wall of the cylinder H and its extension J is separated therefrom by a film-like space only.

Resting on the upper end of the cylinder member H is a burner member T shaped to provide a hollow gas channel T' surrounding the cylinder extension J receiving gas through the pipe $T^2$ which passes out of the burner through the small vertical gas ports $T^3$ formed in the upper end of the burner. The burner member T is provided with an annular flange $T^4$ at its base which forms a support for the heat insulating jacket U which surrounds and forms the outer wall of the combustion chamber. Advantageously, the heat insulator U may be in the form of a hollow glass body having the air exhausted from the annular vacuum space U', and advantageously also, having the inner walls of the space U' coated with silver or otherwise made reflecting in order to cut down the transfer of heat from the interior to the outer side of the insulator.

V represents wind shields secured to the burner and cutting off the suction of the fan to the extent required to permit the proper flow of air for combustion into the interior of the jacket U through the lateral port $U^2$.

In operation, the angular displacement of the two crank pin shafts N and P on which the lower ends of the connecting rods M and Q are journaled, causes the piston K and air displacer S to move relatively to each other and to the working chamber in the manner characteristic of engines of this type to alternately force the air into the upper end of the working chamber where the air is heated and expands and forces the piston K downward, and then to transfer the air into the relatively cool lower end of the working chamber whereupon the air contracts and the piston K moves upward.

The efficiency of the engine is obviously enhanced by the relatively wide difference in the temperatures of the two ends of the working chamber, due, on the one hand, to the effective manner in which loss of heat from the combustion chamber and the cylinder extension J is prevented by the heat insulating jacket U; and on the other hand, to the effective provisions made for cooling the cylinder member H. The conical form given to the lower end of the air displacer S in conjunction with the conical cavity formed in the inner end of the piston K is beneficial in that it increases the heat radiating surface of the lower end of the displacer S while at the same time permitting practically all of the air in the working chamber to be transferred to the upper end of that chamber at the proper stages in the operation of the engine.

The provision of the cross head R working within the piston and bearing against the guide surfaces $K^4$ formed on the latter obviously reduces the friction loss and wear which the side draft of the connecting rod Q tends to produce, and what is of perhaps greater importance, the use of this cross head greatly reduces the tendency of the side thrust of the connecting rod Q to move the air displacer S into contact with the cylindrical wall of the working chamber. Inasmuch as the passage through the closed end of the piston for the air displacer stem S', and the guide surfaces K⁴ for the cross head are both formed in or on the same piece of metal, to wit, the piston, it is a simple matter to obtain the accurate relation between the passage and guide surfaces necessary for satisfactory operation. Where the guide surfaces K⁴ are cylindrical, as in the preferred construction illustrated, these surfaces and the passage for the stem S' may both be bored out with one setting of the piston in a suitable boring mill.

While in accordance with the provisions of the statutes we have illustrated and described the best form of our invention now known to us, it will be apparent to those skilled in the art that changes may be made in the form of the apparatus disclosed without departing from the spirit of our invention, and that under some conditions certain features of our invention may be used with advantage without a corresponding use of other features.

Having now described our invention, what we claim as new and desire to secure by Letters Patent is,

1. A hot air engine comprising in combination a working chamber, a hollow piston working therein and having its inner end closed except for a central passage therethrough and having cylindrical cross head guide surfaces within said passage formed on the inner wall of the piston, an air displacer working within said chamber, a cross head working on said guide surfaces, a stem extending through said passage and connecting said displacer and cross head and operating connections to said piston and cross head for moving them relatively to each other and to said working chamber.

2. In a hot air engine, the combination with a cylinder wall surrounding the working chamber, of means for heating one end of said chamber, said means comprising a heat insulating jacket which surrounds the cylinder wall at the end of said chamber to be heated and is separated therefrom by an annular combustion space and is formed with a hollow wall to provide an annular vacuum space surrounding the combustion chamber.

3. In a hot air engine, the combination with a cylinder wall surrounding the working chamber, of means for heating one end of said chamber, said means comprising a glass shell surrounding the cylinder wall at the end of said chamber to be heated and separated therefrom by an annular combustion space, said shell being formed with a hollow wall to provide an annular vacuum space surrounding the combustion chamber.

4. In a hot air engine, the combination with a cylinder wall surrounding the working chamber, of means for heating one end of said chamber, said means comprising a glass shell surrounding the cylinder wall at the end of said chamber to be heated and separated therefrom by an annular combustion space, said shell being formed with a hollow wall to provide an annular vacuum space surrounding the combustion chamber, and having a coating applied to the inner wall surface of said vacuum space to increase the heat reflecting properties of said shell.

LUTHER D. LOVEKIN.

Witnesses as to the signature of Luther D. Lovekin:
E. H. PATTERSON,
H. J. SMITH,

CHARLES J. RAMSBURG.

Witnesses as to the signature of Charles J. Ramsburg:
JOHN E. HUBBELL,
ARNOLD KATZ.

ROBERT P. NICHOLS.

Witnesses as to the signature of Robert P. Nichols:
EDW. L. NICHOLS,
JARED T. NEWMAN.

Copies of this patent may be obtained for five cents each, by addressing the "Commissioner of Patents, Washington, D. C."